United States Patent [19]

Winkowski

[11] 4,421,808

[45] Dec. 20, 1983

[54] WOOD PLANK WALLCOVERING SYSTEM

[75] Inventor: Daniel A. Winkowski, Tonawanda, N.Y.

[73] Assignee: National Gypsum Company, Dallas, Tex.

[21] Appl. No.: 365,991

[22] Filed: Apr. 6, 1982

Related U.S. Application Data

[63] Continuation-in-part of Ser. No. 327,242, Dec. 3, 1981.

[51] Int. Cl.³ .......................... B32B 3/14; B32B 3/16

[52] U.S. Cl. ........................................ 428/55; 428/56; 428/151; 428/343; 428/905; 428/904.4

[58] Field of Search ...................... 428/54, 55, 56, 151, 428/343, 904.4; 429/905

[56] References Cited

U.S. PATENT DOCUMENTS 2,100,175 11/1937 Tomec .............................. 428/151

*Primary Examiner*—Marion McCamish
*Attorney, Agent, or Firm*—Robert F. Hause

[57] ABSTRACT

A plurality of rolls of wallcovering having a wood grain design in a plurality of different widths which, in strips, is applied on a wall over previously applied adhesive, which preferably is pigmented to a relatively dark color. Alternatively, the wallcovering strips are formed with an adhesive on the back and are applied in an alternating manner with narrow, dark-colored strips having an adhesive on the back, the dark strips simulating grooves between simulated wood planks.

8 Claims, 2 Drawing Figures

WOOD PLANK WALLCOVERING SYSTEM

This application is a continuation-in-part of my application Ser. No. 327,242, filed Dec. 3, 1981.

This invention relates to a wallcovering system, and particularly to a combination of wood grained wallcovering strips and an adhesive, and to the method of making a simulated wood plank wall.

Simulated wood plank walls are very popular and products are available for producing them. A simulated wood plank wall can be made by using predecorated 4'×8' plywood panels. Another method would be to hand 4' wide predecorated wallcovering, abutting adjacent strips tightly together along each joint.

The present invention employs relatively narrow strips of wallcovering, which are provided in a plurality of narrow widths, and which may be applied by a professional or a do-it-yourselfer. In the preferred form, the strips have a wood grain pattern and are spaced apart leaving a pigmented adhesive show through at the spaced joints.

In another preferred form, a narrow colored tape is applied to a wall at spaced locations to simulate grooves, and wider strips, preferably varied in widths, having a wood grain pattern are adhered to the wall in the spaces between the narrow colored tapes, preferably overlapping the narrower groove-simulating tapes.

It is an object of the invention to provide a novel form of wallcovering.

It is a further object to provide a novel simulated wood plank wall.

These and other objects and advantages will be more readily apparent when considered in relation to the preferred embodiments as set forth in the specification and shown in the drawings in which.

Figure 1:
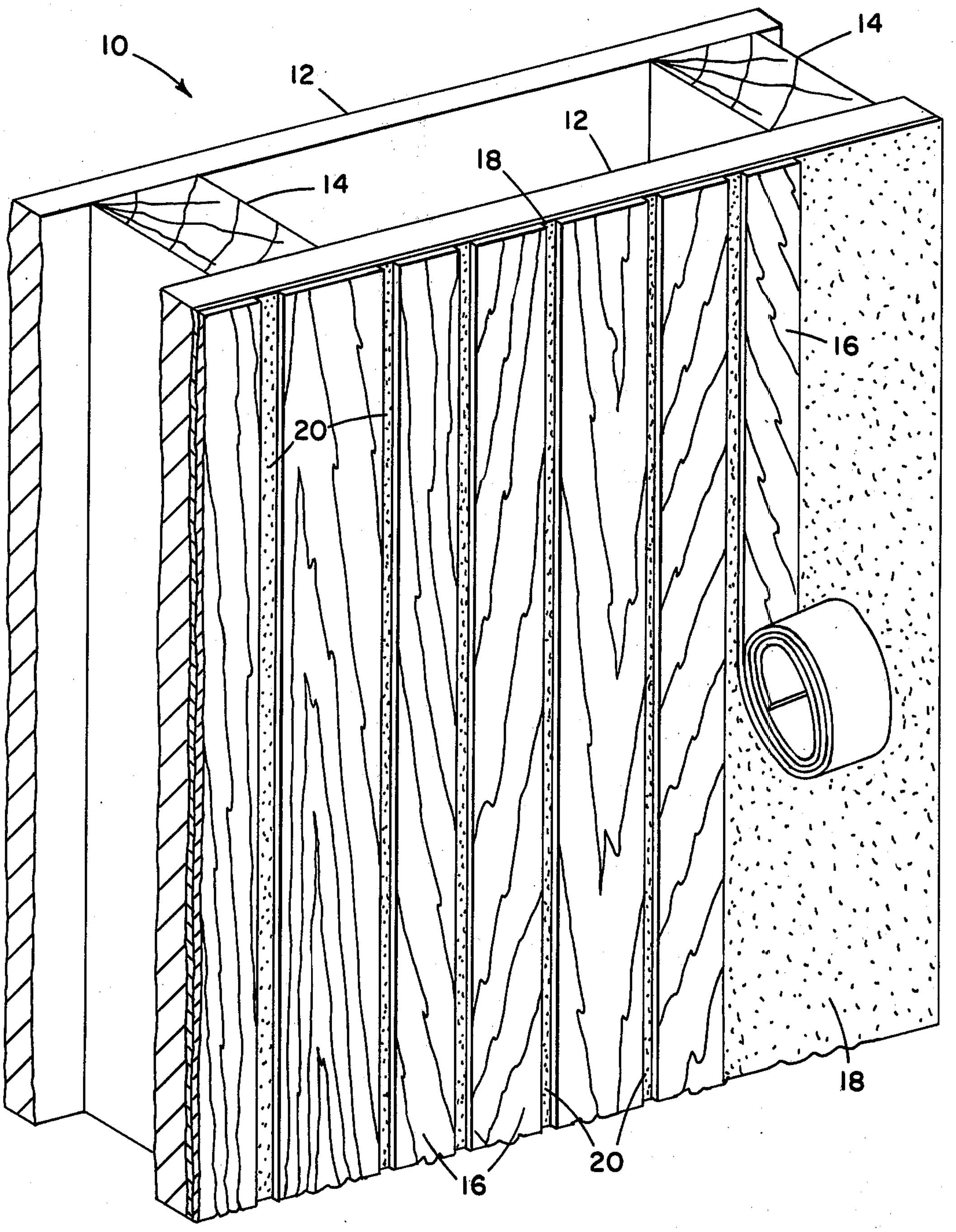
FIG. 1 is an isometric view of a section of wall with simulated wood planking strips applied thereon in accordance with the invention.

Referring to FIG. 1, there is shown a wall 10 in which wallboards 12, 12 are affixed to studs 14, 14. On the face of wall 10 shown, there is adhesively applied narrow wallcovering strips 16, 16. Strips 16, 16 are held to the wallboard by a pigmented adhesive layer 18, which in the finished wall is exposed in the narrow grooves 20, 20, formed between adjacent strips 16, 16, by the slight spacing apart of the strips 16, 16.

In the preferred form of the invention, the strips 16, 16 vary, one from another, with widths ranging from about three inches to about eight inches. The strips 16, 16 preferably have a design on the face which may simulate a wood grain. The spacing between the strips is preferably in the range of about ⅛ inch to ½ inch.

The strips 16, 16 may be a single ply or a plurality of laminated plies. In the preferred form the strips 16, 16 consist of a relatively thick paperboard of about 0.020 inch thickness and a relatively thin decorated veneer ply of about 0.001 inch. Very fine veneer plies of about 0.001 inch thickness wood grain gravure printed paper are available in the United States, made in Japan by Dai Nippon Printing Co. or by Toppan Printing Company.

In the preferred form of the invention, the adhesive layer 18 is a combination of a dark pigment, such as carbon black, mixed with an adhesive, such as a polyvinyl acetate, polyvinyl alcohol or an acrylic, formulated to provide a few minutes of tack time, after being applied to the wall, during which the strips 16, 16 may be applied. It is contemplated that the strips 16, 16 would be marketed in rolls, the rolls being of various widths, which rolled material can then be applied over the adhesive, as shown in the drawing.

The adhesive layer 18 may be applied over the wall with a roller or a brush. The strips 16, 16 may be pressed firmly against the adhesive layer using a broad knife.

The strips 16, 16 as manufactured, may also include a thin clear protective coating, such as polyvinyl chloride, acrylic, melamine, lacquer or an extruded coating of polyethylene.

The invention is particularly advantageous to the common do-it-yourselfer in that the materials to be purchased are easily brought home in a shopping bag. The adhesive may easily be applied using a paint roller. The narrow strips are very easy to handle and align, as compared to the common wider wallcoverings or decorated wood panels.

Figure 2:
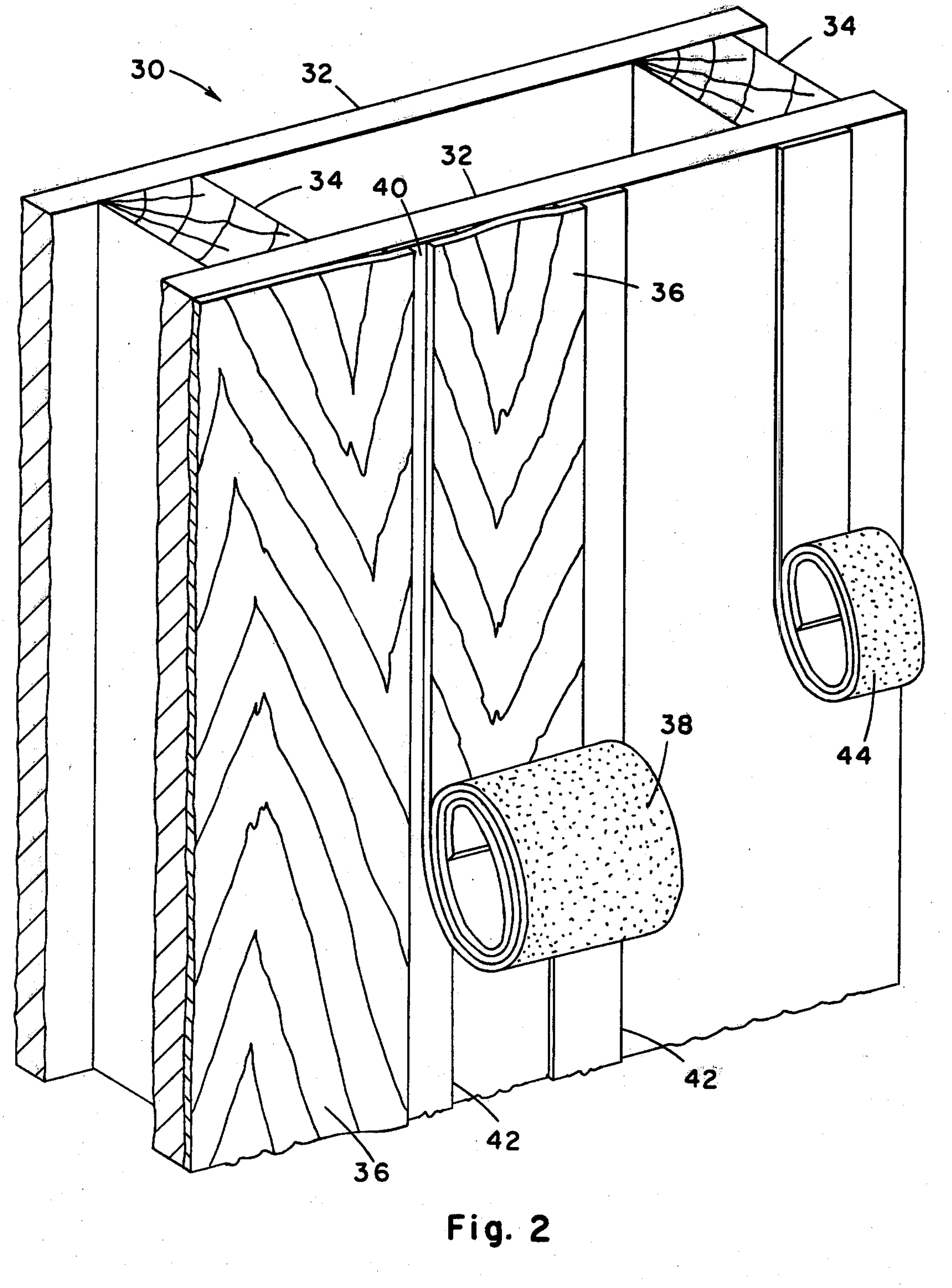
FIG. 2 is a view similar to FIG. 1 showing a modified form of the invention.

Referring to FIG. 2, there is shown a second preferred form of the invention, including a wall 30 in which wallboards 32, 32 are affixed to studs 34, 34. On the face of wall 30 shown, there is adhesively applied narrow wallcovering strips 36, 36. Strips 36, 36 are held to the wallboard by a pressure-sensitive adhesive 38 on the back of strips 36, 36. Strips 36, 36 are shown extending vertically; however, they can be arranged diagonally, as in a herringbone pattern, or horizontally. A plurality of strips 36, 36 are arranged in parallel relationship with a slight space between each forming narrow grooves 40, 40.

Disposed in grooves 40, 40 are very narrow colored thin tapes 42, 42, held independently to the wallboard by a pressure-sensitive adhesive 44 on the back of tapes 42, 42. Preferably, tapes 42, 42 are wider than grooves 40, 40, for example about ½ inch to 1 inch, 0.001 to 0.005 inch thick, and strips 36, 36 overlap a tape 42 along each edge. Tapes 42, 42 could be paper like masking tape or plastic like electrical tape.

Strips 36, 36 preferably have a wood grain design and vary in width similar to strips 16, 16. Strips 36, 36 may be a single ply or a plurality of laminated plies. In the preferred form, strips 36, 36 consist of a paperboard of about 0.015 to 0.020 inch thickness, printed on the front with a wood grain pattern.

In addition to wood grain patterns, with dark-colored tape, strips 36, 36 could be plain colors, printed designs such as florals, foils and many others. Tape 42 could also have printed designs that cooperate with the strip designs to make many novel combinations.

Tape 42 could also be disposed under spaced apart end joints of strips 36, 36, with random length and random width strips 36, 36 being used.

Having completed a detailed description of the preferred embodiments of my invention so that those skilled in the art may practice the same, I contemplate that variations may be made without departing from the essence of the invention.

I claim:

1. A wallcovering combination for covering a single wall comprising a plurality of strips of wallcovering all having widths in the range of from about 3 inches to about 8 inches and all having a common decorative pattern, a pressure-sensitive adhesive on the back surface of said strips for adhering the strips to a wall in parallel spaced relationship one to another and, as separate elements, a plurality of narrow tapes of from about ½ inch to about 1 inch and of contrasting appearance, having a pressure-sensitive adhesive on the back surface of said tapes for adhering said tapes in the spaces between said wallcovering strips.

2. A wallcovering combination as defined in claim 1 wherein said strips of wallcovering have a wood grain pattern and said tapes are dark colored to provide a plank groove apearance.

3. A wallcovering combination as defined in claim 2 wherein said strips of wallcovering are of a plurality of varied widths, whereby a random wood plank effect is produced.

4. A decorated wall comprising a flat surface and adhered thereto a plurality of wallcovering elements, said wallcovering elements including a plurality of parallel, spaced apart, narrow thin strips of wallcovering material all of from about 3 to about 8 inches in width adhered to the surface by a pressure-sensitive adhesive and, as separate elements, a plurality of narrower thin tapes of contrasting appearance having a pressure-sensitive adhesive on the back thereof, said tapes being adhered to said flat surface in spaces between each of the closely adjacent pairs of said about 3 to about 8 inch wide strips.

5. A decorated wall as defined in claim 4 wherein said tapes have a thickness of about 0.001 to 0.005 inch.

6. A decorated wall as defined in claim 5 wherein said tapes are about $\frac{1}{8}$ to 1 inch wide and said about 3 to about 8 inch wide strips overlay portions of said tape at each edge.

7. A decorated wall as defined in claim 6 wherein said about 3 to about 8 inch strips are of a plurality of varied widths and lengths and are disposed extending vertically, with a wood grain pattern thereon, and said tapes have a dark-colored front face, providing a random wood plank effect.

8. A decorated wall as defined in claim 6 wherein said about 3 to about 8 inch wide strips are disposed with a diagonal extent on said flat surface, in a herringbone plank arrangement.

* * * * *